United States Patent Office 2,942,054
Patented June 21, 1960

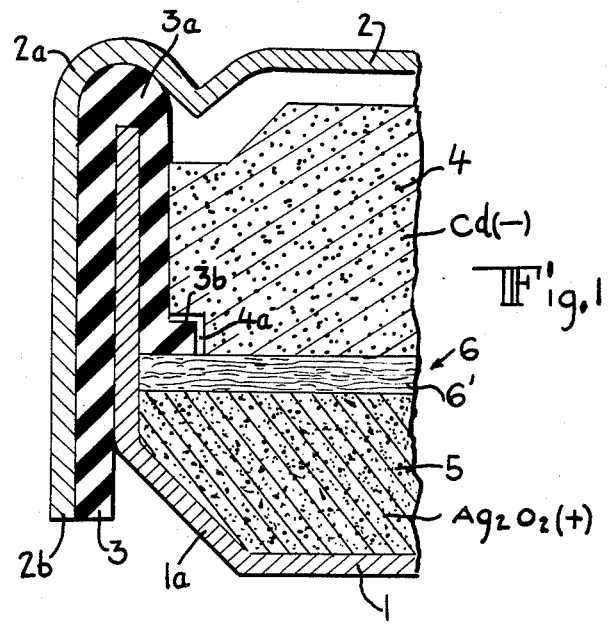
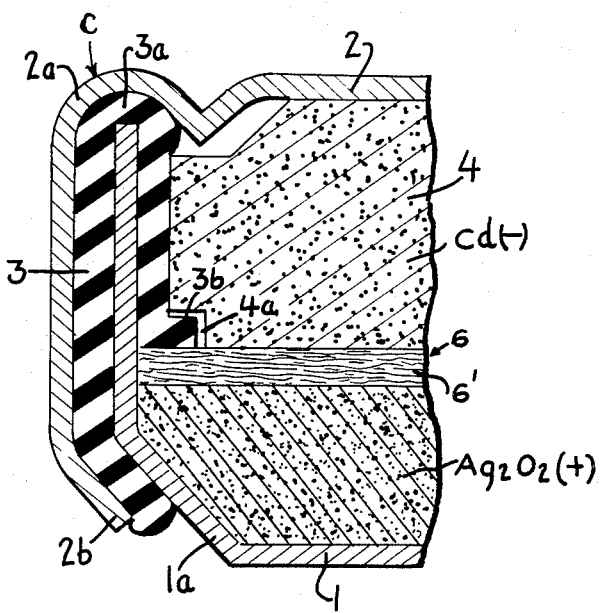

2,942,054

PRIMARY CELL AND METHOD OF MANUFACTURE

Robert Achille Antoine Jeannin, Paris, France, assignor to Societe des Accumulateurs Fixes et de Traction (Societe Anonyme), Romainville, France, a company of France Filed Sept. 10, 1957, Ser. No. 683,077

Claims priority, application France Sept. 20, 1956

8 Claims. (Cl. 136—83)

This invention relates to miniature power sources such as primary cells and to methods of their manufacture.

The miniaturization of the portable electric or electronic devices such as radios, hearing aids and the like makes very severe requirements for independent power sources and more especially for primary cells.

It is necessary that such primary cells may be made of a very small size. They must, moreover, be fluid-tight so that no leakage of electrolyte can occur to corrode the devices in which they are used or cause internal short-circuiting thereof. It is evident that this tightness implies that no gas is evolved either during the shelf-life of the cells or during their functioning.

It is, moreover, necessary that the cells retain their charges over a long period of time so that in practice their open circuit deterioration must be negligible. Additionally, for suitable functioning of the devices which they energize, their electrical characteristics and more especially their internal resistance and their terminal open circuit voltage must vary as little as is possible.

Numerous primary cell structures have already been proposed to satisfy these many requirements. However, none of the already known cells has been found to fully satisfy all these needs, because of the complexity of the problem involved, most especially when very small cells are to be provided, since in such small cells the surface effects become preponderant as compared to the effects of the masses brought into use.

A primary object of the present invention is the provision of a cell in which the elements employed satisfy several needs at the same time without unfavorably influencing each other, so that the cell, made up of these combined elements fully meets all the above noted requirements; namely: small size, total tightness, long life and constant electrical characteristics, and in addition has the advantage of being rechargeable.

According to one feature of the invention, the cell comprises a positive electrode essentially made of silver peroxide ($Ag_2O_2$) particles agglomerated by pressure and a negative electrode essentially made of spongy cadmium also agglomerated by pressure, both electrodes being separated by a semi-permeable diaphragm and the whole being impregnated by an alkaline electrolyte. In an advantageous embodiment of the invention, the cell is enclosed in a two part silver coated casing separated by a leak proof insulating gasket so that each part is in contact with one electrode only.

Other objects and features of the invention are the provision of novel methods of preperation of the electrodes and of assembly of the elements to provide leak-proof cells meeting all of the requirements hereinabove mentioned.

Further objects and features of the invention are the provision of simple structures consisting of a minimum of elements that are readily and simply assembled and which provide the novel cells that satisfy the requirements herein noted.

Further objects and features of the invention will become apparent from the following specification and the accompanying drawing wherein:

Figure 1 shows a sectional view of a portion of an assembled cell before crimping together of the casing parts; and Figure 2 shows the similar view of a completed cell after the crimping operation has been completed.

This cell C essentially comprises a two part casing one of whose parts is a bottom 1 and the other of which is a lid 2, both at least of silver clad metal, i.e. a base metal, superficially clad or coated with pure silver, or both may be entirely of pure silver, and of a tight gasket or bushing 3 interposed between walls of the bottom and the lid. The said casing contains the negative cadmium compact element 4, the positive silver peroxide compact element 5, and a semi-permeable diaphragm 6 for example of polyvinyl alcohol film, everything being impregnated with a sodium hydroxide solution as electrolyte.

The shape of the cell C on a plane perpendicular to the plane of the drawing is optional, preferably being rounded. It may be circular, oval, or even bean-shaped, or sector-shaped with rounded corners when the cell must be housed for example within and against the walls of a disc-shaped general casing (not shown) containing the electric device, as for example clockworks, which must be energized. More especially the latter-named shape may be convenient when the cell C is used as a power source for an electrical clockwork.

The mode of manufacturing the elements and assembling them to form the cells is as follows:

Preferably the pressure utilized for agglomerating the electrode elements 4 and 5 is carried on until each is brought to the state of a porous compact which is coherent "per se." In such a way, the use of metal backings for these elements is avoided. This is advantageous because such backing would add useless weight to the cell and be capable of creating secondary couples which would hinder the retention of its charge. Nevertheless the electrical contacts between the particles constituting the electrodes are satisfying.

The semi-permeable diaphragm 6 between the electrodes 4 and 5 advantageously comprises several superposed layers 6′ of organic material. The said layers 6′ may be of regenerated cellulose without polyalcohols plasticizers, or else of polyvinylic alcohol.

The alkaline electrolyte of the cell C preferably consists of a sodium hydroxide solution. The use of sodium hydroxide as the electrolyte has several advantages over the use of potassium hydroxide. In the first place, sodium hydroxide, though having a lower electrical conductivity than potassium hydroxide, dissolves (or makes a suspension with) silver peroxide to a much less extent than potassium hydroxide. In this way a transfer of silver oxide from electrode 5 into the semi-permeable diaphragm 6 is avoided, the silver oxide, due to its notable oxidizing quality, being liable to be reduced in this place by the organic material of the diaphragm. The use of sodium hydroxide thus prevents deposits of metal silver in the semi-permeable diaphragm 6. Such deposits are objectionable as they shorten the life of the cell and are likely to bring about internal short circuiting thereof.

Moreover, it is easier to secure a fluid-tight closing or sealing of the cell when sodium hydroxide is used, because it is less mobile than potassium hydroxide.

Since silver makes up no electrochemical couple with cadmium or with silver peroxide, the cell voltage is independent of the silver of the casing parts 1 and 2 and only depends on the electrochemical couple of the positive and negative electrode elements 5 and 4 used, in this instance respectively silver peroxide and cadmium, The electrochemical reactions which take place in the silver clad casing are therefore limited to those which take place in the active materials of said electrodes. The said reactions do not evolve gas, and may be written in the following way, during the functioning of the cell C:

$$\tfrac{1}{2}Ag_2O_2 + 2(H)^+ \rightleftharpoons Ag + H_2O$$

$$Cd + 2(OH)^- \rightleftharpoons Cd(OH)_2$$

The original system of silver peroxide-cadmium therefore tends to become a system of silver-cadmium hydroxide without secondary reactions and with fixation of a molecule of water.

It is to be noted first that the said reactions are reversible. Hence such a cell is also rechargeable without evolving gases.

It is moreover to be noted from these reactions as regards particularly the internal resistance of the cell C, that the original system which is constituted of a metal (cadmium) and an oxide ($Ag_2O_2$) in series connection, is gradually replaced during use of the cell by a system comprising a hydroxide $Cd(OH)_2$ and a metal Ag in series connection so that the variation of the internal resistance during use and in transition between the two states, is very small.

Additionally it can be observed from these reactions that whereas the loss of oxygen in the transformation of silver peroxide to silver makes the silver peroxide positive compact element 5 more and more porous, while the transformation of cadmium to cadmium hydroxide makes the cadmium negative compact element 4 less and less porous. Thus the variation in volume within the cell existing for the electrolyte is small. As a consequence, in such a cell it is not necessary to provide either a reserve of electrolyte or a storage space in which the electrolyte could be collected during operation.

The practical embodiments of the cells C embodying the invention may, therefore, be very small and compact. However, in preparation of the electrode elements the pressure exerted upon the spongy cadmium to produce the negative element must be lower than the pressure exerted upon the silver peroxide to produce the positive element so that the porosity of the negative electrode will be lowered while the porosity of the positive electrode increases during use of the cells.

In practice, silver peroxide powder used in producing the silver peroxide positive electrode or compact 5 may be originally compressed until no apparent pores remain, i.e. until its density is only lower by only a few percent than that of solid silver peroxide.

The description of the electrode manufacturing processes and assembly procedure for producing an embodiment of the invention will help understand how such a cell C may be obtained, the manufacturing processes and other particulars being of course part of the invention.

PREPARATION OF SILVER PEROXIDE PARTICLES OR POWDER

For preparing pure silver peroxide particles with a yield of about 100%, the silver oxide is precipitated from a silver salt in solution by the means of an excess of caustic alkali and the silver oxide provided in this alkaline medium, is treated with a strong oxidizing agent.

The strong oxidizing agent may be sodium hypochlorite in a solution titrating between 40 to 50 chlorometric degrees (12 to 15 British chlorometric degrees), or preferably pure sodium persulfate.

Under these conditions, the silver oxide $Ag_2O$ which is precipitated as voluminous clots, is slowly and regularly oxidized by the reagents and is transformed into a fine black powder of silver peroxide $Ag_2O_2$.

The following examples will show the specific procedure:

*Example I.—Sodium hypochlorite derivation of $Ag_2O_2$ powder*

The following solution is poured into a 5 liters beaker provided with a stirring device.

Sufficient flasks of sodium hydroxide to the amount
of _____gm__ 350
Distilled water _____ml__ 800
Sodium hypochlorite at 45° chlorometric (14° British) _____ml__ 800

The solution in the beaker is heated to 60° C. and the stirring device is started.

Cold silver nitrate solution is then slowly poured (the operation taking about 5 minutes) into the beaker, said solution being in the amount of 500 ml. containing 108 g. of metal silver (corresponding to 1 mol of silver nitrate). Precipitation occurs.

When the precipitation is completed, the stirring device is left on for about 2 hours while the solution is maintained at between 60° and 80° C.

In order to obtain a product quite free of silver chloride, the operation may be advantageously repeated by decanting the precipitate thus obtained and oxidizing it again by the means of a fresh solution of sodium hypochlorite.

Finally, the black powder $Ag_2O_2$ thus obtained is washed with distilled water and by decanting, then the powder is collected in a vacuum filter device and dried in a drying oven at 70°–80° C.

In this way a weight of silver peroxide ($Ag_2O_2$) powder of 123 gm. to 123.5 gm. is obtained instead of the theoretical 124 gm. due to the unavoidable losses occurring during handling. The powder passes a 250 mesh screen.

*Example II.—Sodium persulfate derivation of $Ag_2O_2$ powder*

The reactions occurring in this example, are the following ones:

$$2AgNO_3 + 2NaOH \rightleftharpoons 2NaNO_3 + Ag_2O + H_2O$$

$$Na_2S_2O_8 + Ag_2O + 2NaOH \rightleftharpoons 2Na_2SO_4 + Ag_2O_2 + H_2O$$

On the whole, $2AgNO_3$ requires $4NaOH$ to yield $Ag_2O_2$. To carry out these reactions:

Into one liter of a solution containing 1.18 mols of silver nitrate (i.e. 200 gm. of metal silver) in distilled water, one liter of pure sodium hydroxide solution is poured, said sodium hydroxide solution being composed of Pure sodium hydroxide _____gm__ 227
Distilled water enough for 1 liter.

This amount of sodium hydroxide is 2.4 times that which corresponds to the amount required for the two above mentioned reactions taken together.

Distilled water is then added until a total volume of solution of 2.900 liters is obtained (i.e. a concentration approximating 70 gm. of silver nitrate per liter).

The solution is then heated to about 50° C. and 224 gm. of sodium persulfate powder is added in small amounts to the extent of about 1.16 times the required amount of sodium persulfate for the above reactions, this operation taking a few minutes.

The solution is then boiled and stirred for about half an hour. It then is left standing until the sedimentation which occurs is over. The black powder thus resulting is washed first by decanting with lukewarm distilled water, then in a vacuum filter until the wash water is free of sulfates. The collected $Ag_2O_2$ powder is then dried at from 70° to 80° C. in an oven.

The powder product thus obtained is silver peroxide which is practically pure and passes a 250 mesh screen.

PREPARATION OF SPONGY CADMIUM PARTICLES OR POWDER

The preparation of spongy cadmium is carried out by precipitating the cadmium from an acid solution of cadmium sulfate by the means of extremely pure zinc in plate form. In such a case the cadmium precipitated by the zinc peels off spontaneously as light spongy films which are collected.

The mode of procedure will be easily understood by reference to the following example:

*Example III.—Derivation of spongy cadmium powder*

1000 ml. of a cadmium sulfate aqueous solution containing a mols of metal cadmium, i.e. 224 gm. (solution pH=0.5) are poured in a 1500 ml. beaker.

The solution is heated to about 50° C. Then several plates of very pure (99.99%) zinc are immersed in the solution, care being taken that their edges and faces are not in contact with each other.

Cadmium is immediately precipitated on the surface of the plates of zinc which is changed to zinc sulfate. The said cadmium peels off as light spongy films which, floating, rise to the surface of the solution. They are carried back to the bottom of the beaker by slightly pushing them down. The operation is stopped before the zinc plates are disintegrated so that no zinc is incorporated with the cadmium.

Pure zinc possesses the notable property of not retaining precipitated cadmium on its surface. Due to that, spontaneous separation during the precipitation may proceed. On the contrary, cadmium clings to insufficiently pure commercial zinc and the separation is only obtained by scraping which may incorporate zinc particles into the cadmium. Since zinc produces zincates with an evolution of hydrogen when brought into contact with alkalis, it is of the utmost importance to avoid incorporation of zinc into the cadmium and to obtain pure cadmium by using pure zinc. After washing the cadmium derived as above described it is dried under a vacuum-bell containing drying agents.

After about 12 hours, the cadmium in the bell is completely dry. The bell is then filled with nitrogen which is left therein for about one hour. The cadmium is removed from the bell as agglomerated clods. These clods are very easily and very rapidly reduced to impalpable powder in an electric grinder.

The ground powder is sifted through a 200 mesh sieve or screen (200 meshes to the inch) into containers which are then sealed to keep the powder away from air.

CELL MANUFACTURE

Silver peroxide powder derived as above described is compressed in the bottom 1 of the casing by means of a press and by using a suitably-shaped die and matrix. The applied pressure may be several times 1 ton/cm.$^2$ for example from 4 to 5 ton/cm.$^2$. In this way the positive silver peroxide compact or element 5 is directly adhered to bottom 1, the apparent upper surface of said compact 5 has been pressed appearing black and bright after the said pressure.

Then, several sheets 6' punched out in the desired shape to fit the inner wall dimensions of casing part from a polyvinyl alcohol film, are placed on the upper surface of said silver peroxide compact. Five or six such sheets 6' each 0.05 mm. thick are thus superposed in order to build up the semi-permeable diaphragm 6.

Then the insulating bushing 3 of substantially inverted U-section is placed astride the edge of the wall of the bottom 1, so that its portion 3a completely encases the said wall edge, said bushing being provided on its internal rim with a peripheral flange 3b which then bears upon the upper surface of the semi-permeable diaphragm 6.

A mass of cadmium powder derived as described is inserted into a die and is agglomerated by a press so that it forms the negative element compact 4 which is dimensioned as shown in Figure 1 to be insertable into the space left in bottom 1 above diaphragm 6 by bushing 3. In this operation the pressure is of about 1 ton/cm.$^2$ ranging from approximately 800 to 1200 kg./cm.$^2$. The die (not shown) provides a peripheral groove 4a along the bottom edge of the negative element or compact 4 for receiving the bushing flange 3b.

Impregnation by electrolyte above described is made at this stage. Each bottom 1 thus filled with a positive element 5, a diaphragm 6 and a negative element 4 is immersed in a sodium hydroxide solution, in vacuo. Or the impregnation with sodium hydroxide electrolyte may be promoted by applying a pressure to electrolyte used to impregnate the contents of each bottom 1.

After impregnation, the impregnated bottoms are removed from the sodium hydroxide solution. They are then carefully wiped externally to remove excess electrolyte and then capped with lids or covers 2 as seen in Figure 1. The said lids or covers 2 which are silver surfaced in the same way as bottoms 1 include a peripheral groove 2a in which the bend 3a of the bushing 3 becomes lodged (see Figure 1). At this time the upper surface of element 4 lies spaced from the inner top surface of lid 2. The lid 2 and bottom 1 are now pressed together to bring their two surfaces into contact and at the same time firmly compress the gasket material in the U-bend 3a within groove 2a.

Lastly, the lower edge 2b of lid 2 is turned down or crimped onto the sloping part 1a of the bottom, completing the cell C.

With this procedure, it is to be noted:

(a) That due to the crimping, the inner upper surface of the lid 2 tightly presses against the upper surface of the negative cadmium compact 4 and the bottom of said compact 4 against the semi-permeable diaphragm 6. Since the said diaphragm 6 swells when it is impregnated with the electrolyte, a good electrical contact is insured between the lid 2 and the negative cadmium compact or element 4;

(b) That the lid 2 is electrically insulated from the bottom 1 by the bushing 3 and the bottom 1 also is insulated from the cadmium compact or element 4 by the inner leg of said bushing 3;

(c) That a migration of silver ions from element 5 towards the cadmium element 4 along the internal side wall of the bottom 1 is avoided or at least considerably slowed or hindered by flange 3b of bushing 3, because the said ions have to move or travel around the said flange 3b to reach the cadmium element 4;

(d) That the sealing tightness of the assembled casing is achieved on the one hand by the squeezing or compressing of the lower external edge of the bushing 3 between the lid edge 2b and the sloping part 1a of the bottom 1, on the other hand by the crushing of the U-bend 3a of the bushing 3 between the upper edge of the bottom 1 and the peripheral internal groove 2a of the lid. This effective sealing makes the cell C leak proof and gas tight and safeguards the apparatus in which it is used against corrosive damage by leaking electrolyte.

For low current outputs, such a cell has a substantially constant working voltage of 1.14 volts. Thus a cell weighing about 2.5 gm. has a capacity of about 150 milliamperes/hour and may be discharged at a current of up to 200 microamperes while retaining its voltage of 1.14 volts. The power output may be of several times 10 microwatts with power peaks up to several milliwatts. Such a cell is able to energize the electromagnetic mechanism of an electrical clockwork for a period of several months and up to one year for that of a watch.

While specific embodiments of the invention have been described and shown, variations in details within the scope of the appended claims are possible and are contemplated. There is no intention therefore of limitation to the exact details hereinabove presented.

What is claimed is:

1. A galvanic cell comprising a two part silver casing, an electrode in one part of the silver casing consisting of silver peroxide ($Ag_2O_2$) particles agglomerated by pressure, a second electrode in the second part of the silver casing consisting of spongy cadmium particles also agglomerated by a lower pressure, a semi-permeable diaphragm of organic material selected from the group consisting of regenerated cellulose film without plasticizer and polyvinyl alcohols, and an alkaline electrolyte impregnant for the electrodes and the diaphragm.

2. A galvanic cell comprising a two part silver casing, an electrode consisting of silver peroxide ($Ag_2O_2$) particles agglomerated by pressure within the casing in surface contact with one of its parts, a second electrode consisting of spongy cadmium particles also agglomerated by pressure within the casing in surface contact with the other of said parts, a semi-permeable diaphragm separating the electrodes, insulation means between the two casing parts and an alkaline electrolyte impregnant for the electrodes and diaphragm, said two casing parts being joined together and being sealed against leakage by said insulation means.

3. A galvanic cell comprising a two part silver casing, an electrode consisting of silver peroxide ($Ag_2O_2$) particles agglomerated by pressure within the casing in surface contact with one of its parts, a second electrode consisting of spongy cadmium particles also agglomerated by pressure within the casing in surface contact with the other of said parts, a semi-permeable diaphragm separating the electrodes, insulation means between the two casing parts and an alkaline electrolyte impregnant for the electrodes and diaphragm, said two casing parts being joined together and being sealed against leakage by said insulation means, said first one of said casing parts being a hollow bottom part containing said agglomerated silver peroxide particles which are adhered to the surface of the bottom part by the agglomerating pressure, and wherein the other of said casing parts is a lid part which fits over said bottom part and is secured to the latter by crimped rim portions.

4. A galvanic cell comprising a two part silver casing, an electrode consisting of silver peroxide ($Ag_2O_2$) particles agglomerated by pressure within the casing in surface contact with one of its parts, a second electrode consisting of spongy cadmium particles also agglomerated by pressure within the casing in surface contact with the other of said parts, a semi-permeable diaphragm separating the electrodes, insulation means between the two casing parts and an alkaline electrolyte impregnant for the electrodes and diaphragm, said two casing parts being joined together and being sealed against leakage by said insulation means, said first one of said casing parts being a hollow bottom part containing said agglomerated silver peroxide particles which are adhered to the surface of said bottom part by the agglomerating pressure, the other of said casing parts being a lid part which fits over said bottom part, and said insulation means being a bushing encasing the wall of the bottom part, said bushing including a peripheral flange lying on said semi-permeable diaphragm, the lid part being secured to said bottom part by crimped rim portions which also compress the outer portion of said bushing and thereby provide sealed union of said lid part and bottom part against leakage of electrolyte.

5. A galvanic cell comprising a two part silver casing, an electrode consisting of silver peroxide ($Ag_2O_2$) particles agglomerated by pressure within the casing in surface contact with one of its parts, a second electrode consisting of spongy cadmium particles also agglomerated by pressure within the casing in surface contact with the other of said parts, a semi-permeable diaphragm separating the electrodes, insulation means between the two casing parts and an alkaline electrolyte impregnant for the electrodes and diaphragm, said two casing parts being joined together and being sealed against leakage by said insulation means, said first one of said casing parts being a hollow bottom part containing said agglomerated silver peroxide particles which are adhered to the surface of said bottom part by the agglomerating pressure, the other of said parts being a lid part which fits over said bottom part and is provided with an internal peripheral groove, and said insulation means being a substantially U-sectioned bushing fitting over and encasing the wall of said bottom part with its U-bend lying within said peripheral groove, said lid part being secured to said bottom part by crimped rim portions which also compress a portion of the bushing against the bottom part and effect deformation of the U-bent portion of said bushing under compression within said peripheral groove to thereby provide sealed union of the lid and bottom parts against leakage of electrolyte.

6. That improvement in the process of preparing galvanic cells comprising providing a hollow bottom part having a silver surface and a lid part also having a silver surface, providing substantially pure silver peroxide powder particles, inserting a mass of such particles into the bottom part and agglomerating them therein under pressure to provide a porous positive electrode compact in contact with the silver surface of the bottom part, covering this compact with a semi-permeable diaphragm, applying an insulating bushing to the bottom part, applying a substantially pure spongy cadmium compact also agglomerated by pressure to form an electrode over the diaphragm, impregnating both electrode compacts and diaphragm within the bottom part with alkaline electrolyte, applying the lid part to the bottom part and joining said two parts so as to compress portions of the bushing between them and provide a seal against leakage of electrolyte and at the same time bring the silver surface of the lid part into intimate contact with the spongy cadmium compact.

7. A galvanic cell comprising a two part silver casing, both parts of substantially pure silver one being a hollow bottom part and the other being a lid part, a positive electrode consisting of silver peroxide ($Ag_2O_2$) particles agglomerated by pressure of from 4 to 5 tons/cm.$^2$ adhered to the silver of the bottom part by the agglomerating pressure, a negative electrode consisting of spongy cadmium particles also agglomerated by pressure of about 1 ton/cm.$^2$ within the casing in contact with the silver of the lid part, a semi-permeable diaphragm separating the electrodes, said diaphragm being of organic material selected from the group consisting of regenerated cellulose film without plasticizer and polyvinyl alcohols, an insulating bushing having substantially U-section encasing a wall of the bottom part above the positive electrode, said bushing having a peripheral flange on an inner portion extending internally of the bottom part and lying on the semi-permeable diaphragm, said negative electrode having a recess for receiving said flange, electrolyte within said casing, said lid part being secured to said bottom part by crimped rim portions which also compress a portion of said bushing and thereby provide sealed union of said lid part and bottom part against leakage of electrolyte from said casing.

8. That improvement in the process of preparing galvanic cells comprising providing a hollow bottom part of substantially pure silver, and a lid part also of substantially pure silver, providing substantially pure silver peroxide powder particles capable of passing a 250 mesh screen, inserting a mass of such particles into the bottom part and agglomerating them therein under pressure of about 4 to 5 tons/cm.$^2$ to provide a porous positive electrode compact adhered by said pressure to the silver of the bottom part, covering this compact with a semi-permeable diaphragm of organic material selected from the group consisting of regenerated cellulose film without plasticizer and polyvinyl alcohols, applying an insulating bushing having substantially U-section to the bottom part over its rim so that one portion of the bushing lies within and the other portion externally of the bottom part, the first-named portion having a flange resting on said diaphragm, applying a negative electrode compact consisting of substantially pure spongy cadmium agglomerated by pressure of about 1 ton/cm.$^2$ over the diaphragm, said spongy cadmium negative electrode compact having a recess to receive said flange, impregnating both compacts and diaphragm while within the bottom part with sodium hydroxide electrolyte, applying the lid part so that its side walls and rim portion extend over the rim portion and side walls of the bottom part, pressing the lid part and bottom part together to compress the bushing and bring the silver of the lid part into intimate contact with the spongy cadmium negative electrode compact and then crimping the rim portion of the lid part against the bottom part to maintain the intimate contact between the spongy cadmium negative electrode compact and the silver of the lid part and also to provide a seal between the lid part and bottom part and the bushing against leakage of the electrolyte.

References Cited in the file of this patent

UNITED STATES PATENTS

| | | |
|---|---|---|
| 897,833 | Hubbell | Sept. 1, 1908 |
| 2,576,266 | Ruben | Nov. 27, 1951 |
| 2,594,710 | Andre | Apr. 29, 1952 |
| 2,601,267 | Ellis | June 24, 1952 |
| 2,611,792 | Andre | Sept. 23, 1952 |
| 2,647,938 | Taylor | Aug. 4, 1953 |
| 2,648,717 | Ross et al. | Aug. 11, 1953 |
| 2,697,737 | Goldberg et al. | Dec. 21, 1954 |
| 2,762,859 | Ostrander | Sept. 11, 1956 |
| 2,795,638 | Fischbach | June 11, 1957 |
| 2,798,988 | Sparkes | July 9, 1957 |
| 2,816,153 | Kort | Dec. 10, 1957 |
| 2,837,590 | Rhyne | June 3, 1958 |
| 2,849,519 | Freas et al. | Aug. 26, 1958 |

OTHER REFERENCES

Mellor, J. W.: "A Comprehensive Treatise on Theoretical and Inorganic Chemistry," Longmans, Green & Co., London, 1923, vol. III, page 469, last paragraph.